(12) United States Patent
Villa et al.

(10) Patent No.: US 8,550,218 B2
(45) Date of Patent: Oct. 8, 2013

(54) REMOTE CONTROL FOR BRAKING SYSTEM OF PROGRESSIVE CAVITY PUMP

(75) Inventors: Jorge Robles Villa, Porto Alegre (BR); Eduardo Perdomini Lara, Porto Alegre (BR)

(73) Assignee: Weatherford Industria e Comecio Ltda., Rio de Janiero (BR)

( * ) Notice: Subject to any disclaimer, the term of this patent is extended or adjusted under 35 U.S.C. 154(b) by 1378 days.

(21) Appl. No.: 11/949,360

(22) Filed: Dec. 3, 2007

(65) Prior Publication Data

US 2008/0135358 A1    Jun. 12, 2008

(51) Int. Cl.
 *H02K 49/00* (2006.01)

(52) U.S. Cl.
 USPC ........ 188/158; 188/72.1; 188/72.4; 188/72.8; 188/106 P; 188/156; 188/180; 188/196 P; 188/216; 166/68; 166/68.5; 166/105; 417/44.11; 417/199.1; 417/214; 417/423.14; 303/10; 303/20; 303/115.2; 303/152

(58) Field of Classification Search
 USPC ............... 303/10; 188/156, 158, 162, 180; 166/68.5, 78.1, 68, 105
 See application file for complete search history.

(56) References Cited

U.S. PATENT DOCUMENTS

| | | | |
|---|---|---|---|
| 3,670,628 A | 6/1972 | Borer et al. | |
| 3,807,902 A | 4/1974 | Grable et al. | |
| 3,884,123 A | 5/1975 | DeVita et al. | |
| 3,966,358 A | 6/1976 | Heimes et al. | |
| 4,865,162 A * | 9/1989 | Morris et al. | 188/72.8 |
| 4,949,623 A | 8/1990 | Schulze | |
| 5,107,967 A * | 4/1992 | Fujita et al. | 188/72.1 |
| 5,152,143 A | 10/1992 | Kajita et al. | |
| 5,209,294 A | 5/1993 | Weber | |
| 5,251,696 A | 10/1993 | Boone et al. | |
| 5,358,036 A | 10/1994 | Mills | |
| 5,551,510 A | 9/1996 | Mills | |
| 5,941,305 A | 8/1999 | Thrasher et al. | |
| 5,957,246 A * | 9/1999 | Suzuki | 188/72.1 |
| 5,960,886 A | 10/1999 | Morrow | |
| 6,039,115 A | 3/2000 | Mills | |
| 6,041,856 A | 3/2000 | Thrasher et al. | |
| 6,056,090 A | 5/2000 | Reimann et al. | |
| 6,079,489 A | 6/2000 | Hult et al. | |

(Continued)

OTHER PUBLICATIONS

Product Information Brochure; "ROD-LOCK: The BOP that Clamps;" Oil Lift Technology, Inc.; Copyright 2006.

(Continued)

*Primary Examiner* — Robert A Siconolfi
*Assistant Examiner* — San Aung
(74) *Attorney, Agent, or Firm* — Wong, Cabello, Lutsch, Rutherford, Brucculeri LLP

(57) ABSTRACT

A brake actuator has a motor that provides input rotation in first and second directions. A reducer couples to the motor and reduces the input rotation into an output rotation to be applied to a brake screw of a progressive cavity pump drive. A sensor measures rotational speed of the drive shaft. In manual operation, an operator can view an indication of the rotational speed and can manually operate the motor accordingly to control rotation of the shaft. In automated operation, a controller automatically controls the motor based on the rotational speed measured by the sensor. The controller can also use a torque sensor to detect the torque applied to the brake screw, a displacement sensor to detect displacement of the brake screw, and/or a current sensor to detect the current consumption of the motor.

24 Claims, 3 Drawing Sheets

(56) References Cited

U.S. PATENT DOCUMENTS

| | | | |
|---|---|---|---|
| 6,113,355 | A | 9/2000 | Hult et al. |
| 6,125,931 | A | 10/2000 | Hult et al. |
| 6,152,231 | A * | 11/2000 | Grenke ............... 166/369 |
| 6,419,472 | B2 | 7/2002 | Kobensen |
| 6,516,879 | B1 | 2/2003 | Hershberger |
| 6,786,309 | B2 | 9/2004 | Saruwatari et al. |
| 6,843,313 | B2 | 1/2005 | Hult |
| 7,044,217 | B2 | 5/2006 | Hult |
| 7,341,109 | B1 | 3/2008 | McDowell |
| 2004/0182657 | A1 * | 9/2004 | Kamiya et al. ......... 188/72.1 |
| 2004/0261407 | A1 * | 12/2004 | Du .................... 60/448 |
| 2005/0045323 | A1 * | 3/2005 | Hult ................. 166/68.5 |
| 2005/0175476 | A1 | 8/2005 | Patterson |
| 2005/0247529 | A1 * | 11/2005 | Gaines et al. ......... 188/72.8 |
| 2007/0158148 | A1 * | 7/2007 | Ohtani et al. ......... 188/158 |
| 2007/0292277 | A1 | 12/2007 | Grenke |
| 2008/0135358 | A1 | 6/2008 | Villa et al. |
| 2008/0142209 | A1 | 6/2008 | Mello et al. |
| 2008/0257555 | A1 | 10/2008 | Waldenstrom et al. |
| 2008/0286134 | A1 | 11/2008 | Regalado et al. |
| 2008/0296011 | A1 | 12/2008 | Hult |

OTHER PUBLICATIONS

Product Information Brochure; "H1800: PC Pump Drive," Oil Lift Technology, Inc.; Copyright 2006.

Product Information Brochure; "G2000: PC Pump Drive," Oil Lift Technology, Inc.; Copyright 2006.

Lea et al.; "What's new in artificial lift: Part 1—Fifteen new systems for beam, progressing-cavity pumping and plunger lift;" World Oil; pp. 59-71; Apr. 2005.

Product Information Brochure; "B500: PC Pump Drive," Oil Lift Technology, Inc.; Copyright 2006.

Product Information Brochure; "B1000: PC Pump Drive;" Oil Lift Technology, Inc.; Copyright 2006.

Product Information Brochure; "B1200: PC Pump Drive;" Oil Lift Technology, Inc.; Copyright 2006.

Lea et al.; "What's new in artificial lift: Part 1—Twenty two new systems for beam, progressing cavity, hydraulic pumping and plunger lift;" World Oil; pp. 71-81; Mar. 2000.

Product Information Brochure (internet); "Weatherford: Direct Gearbox Surface Drives;" printed from: http://www.weatherford.com/weatherford/groups/public/documents/production/pcp_directgearboxdrives.hcsp; printed Dec. 3, 2007; 2 pages.

Final Office Action in U.S. Appl. No. 11/949,374 (205-0065US), mailed Dec. 24, 2009.

Reply to Final Office Action in U.S. Appl. No. 11/949,374 (205-0065US), filed Feb. 23, 2010.

Canadian IPO, Office Action in counterpart Canadian Appl. No. 2,613,625, dated Oct. 8, 2009.

Canadian IPO, Office Action in counterpart Canadian Appl. No. 2,613,630, dated Oct. 19, 2009.

Non Final Office Action received May 22, 2009.

Response to Non Final Office Action of May 22, 2009, filed Aug. 21, 2009.

Notice of Allowance in U.S. Appl. No. 11/949,374 (205-0065US), mailed Jun. 1, 2010.

Office Action in U.S. Appl. No. 12/873,830 (205-0065USC), mailed Feb. 22, 2012.

* cited by examiner

REMOTE CONTROL FOR BRAKING SYSTEM OF PROGRESSIVE CAVITY PUMP

CROSS-REFERENCE TO RELATED APPLICATION

This application claims priority under 35 U.S.C. §119(a) to Brazilian Patent Application No. PI 0605236-3, filed 6 Dec. 2006, which is incorporated herein by reference in its entirety. This application is filed concurrently with U.S. patent application Ser. No. 11/949,374 and entitled "Auxiliary Braking Device for Wellhead Having Progressive Cavity Pump" by Paulo Mello, Eduardo P. Lara, and Dalnei Tomedi, which is incorporated herein by reference in its entirety.

BACKGROUND

Progressive cavity pumps are used for artificial oil lifting operations on wellheads. FIG. 1 illustrates a typical progressive cavity pump system 10 for a wellhead 12. The progressing cavity pump system 10 has a surface drive 20, a drive shaft 30, and a downhole progressive cavity pump 40. At the surface of the well, the surface drive 20 has a drive head 22 mounted above wellhead 12 and has an electric or hydraulic motor 24 coupled to the drive head 22 by a pulley/belt assembly or gear box 26. The drive head 20 typically includes a stuffing box (not shown), a clamp 28, and a polished rod 29. The stuffing box is used to seal the connection of drive head 20 to drive shaft 30, and clamp 28 and polished rod 29 are used to transmit the rotation from the drive head 22 to the drive shaft 30.

Downhole, progressive cavity pump 40 installs below the wellhead 12 at a substantial depth (e.g., about 2000 m) in the wellbore. Typically, pump 40 has a single helical-shaped rotor 42 that turns inside a double helical elastomer-lined stator 44. During operation, the stator 44 attached to production tubing string 14 remains stationary, and surface drive 20 coupled to rotor 42 by drive string 30 cause rotor 42 to turn eccentrically in stator 44. As a result, a series of sealed cavities form between stator 42 and rotor 44 and progress from the inlet end to the discharge end of pump 40, which produces a non-pulsating positive displacement flow.

Because pump 40 is located at the bottom of the wellbore, which may be several thousand feet deep, pumping oil to the surface requires very high pressure. The drive shaft 30 coupled to the rotor 42 is typically a steel stem having a diameter of approximately 1" and a length sufficient for the required operations. During pumping, shaft 30 may be wound torsionally several dozen times so that shaft 30 accumulates a substantial amount of energy. In addition, the height of the petroleum column above pump 40 can produce hydraulic energy on drive shaft 30 while pump 40 is producing. This hydraulic energy increases the energy of the twisted shaft 30 because it causes pump 40 to operate as a hydraulic motor, rotating in the same direction as the twisting of drive shaft 30.

The sum total of all the energy accumulated on drive shaft 30 will return to the wellhead when operations are suspended for any reason, either due to normal shutdown for maintenance or due to lack of electrical power. A braking system (not shown) in drive 20 is responsible for blocking and/or controlling the reverse speed resulting from suspension of the operations. When pumping is stopped, for example, the braking system is activated to block and/or allow reverse speed control and dissipate all of the energy accumulated on the shaft 30. Otherwise, the pulleys or gears of box 26 would disintegrate or become damaged due to the centrifugal force generated by the high rotation that would occur without the braking system. Current braking systems have a brake screw 23 that can be operated directly by an operator. Turning the brake screw 23 can apply or release an internal brake shoe that, in turn, presses on a rotating drum, causing a braking effect to shaft 30.

DETAILED DESCRIPTION

Figure 2:
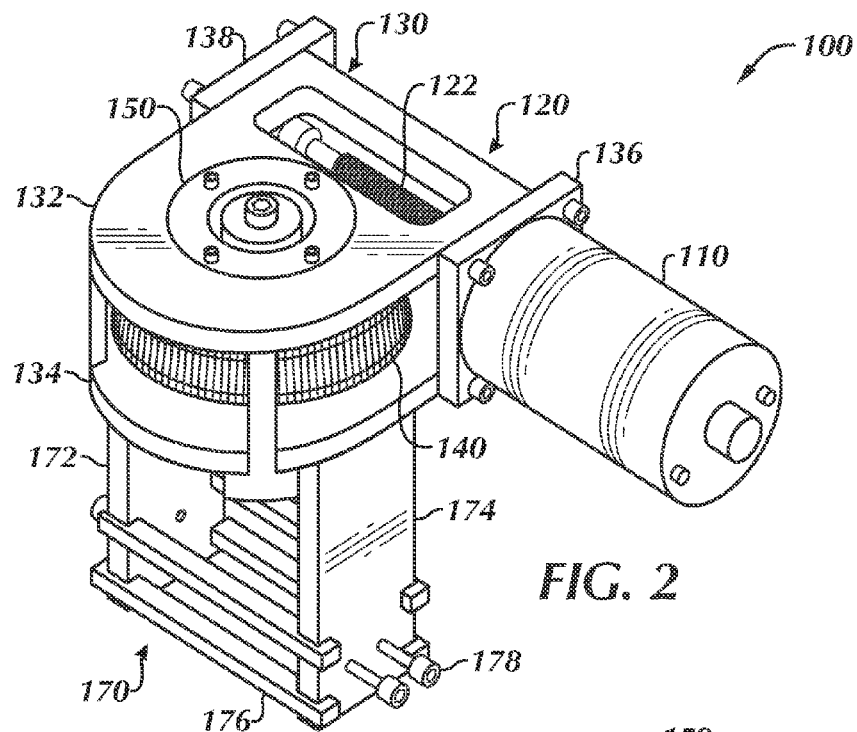
FIG. 2 illustrates a perspective view of a brake actuator according to one embodiment.
Figure 3:
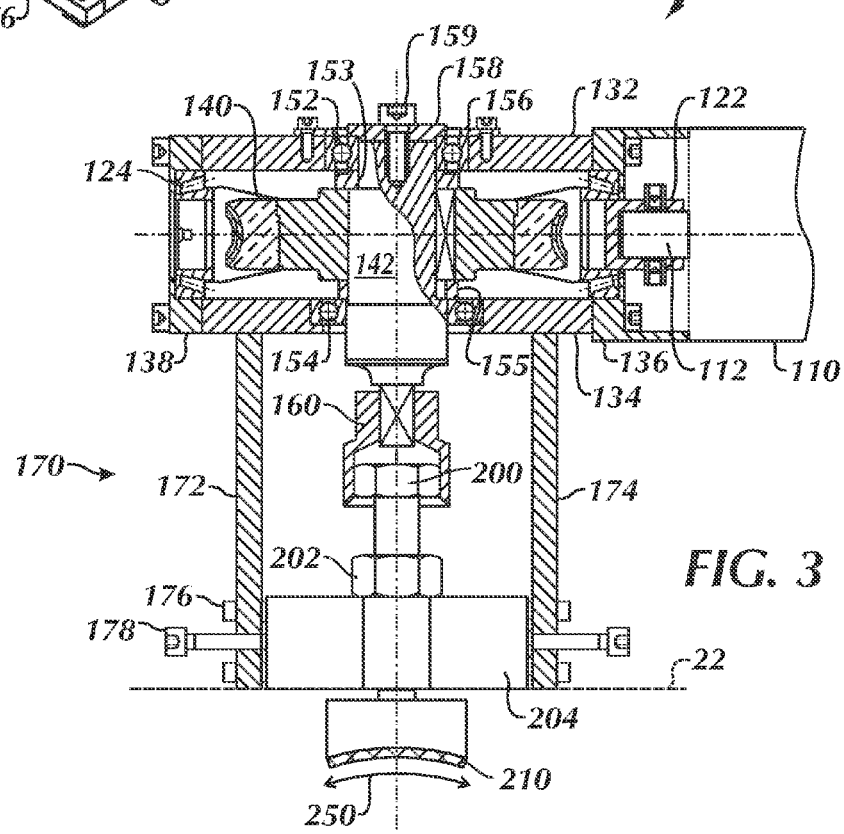
FIG. 3 illustrates a cross-sectional view of the disclosed brake actuator relative to a brake screw and shoe of a pump drive.

FIG. 2 illustrates a perspective view of a brake actuator 100 according to one embodiment, and FIG. 3 illustrates a cross-sectional view of the brake actuator 100 relative to a brake screw 200 and shoe 210 of a drive head 22 for a progressive cavity pump (not shown). In use, brake actuator 100 controls speed of drive shaft rotation 250 by exerting force on a rotatably actuated break mechanism (e.g., brake screw) 200 of a progressive cavity pump drive. Brake actuator 100 applies either more or less force depending on the need at the time. In this way, brake actuator 100 can provide an amount of braking action to keep drive shaft rotation 250 stable and within operational parameters, thereby mitigating damage to wellhead components. In addition, the speed control provided by brake actuator 100 also allows brake shoe 210 to maintain constant pressure on drive shaft rotation 250 during a braking procedure and to compensate for normal wear due to friction with the drum.

Figure 1:
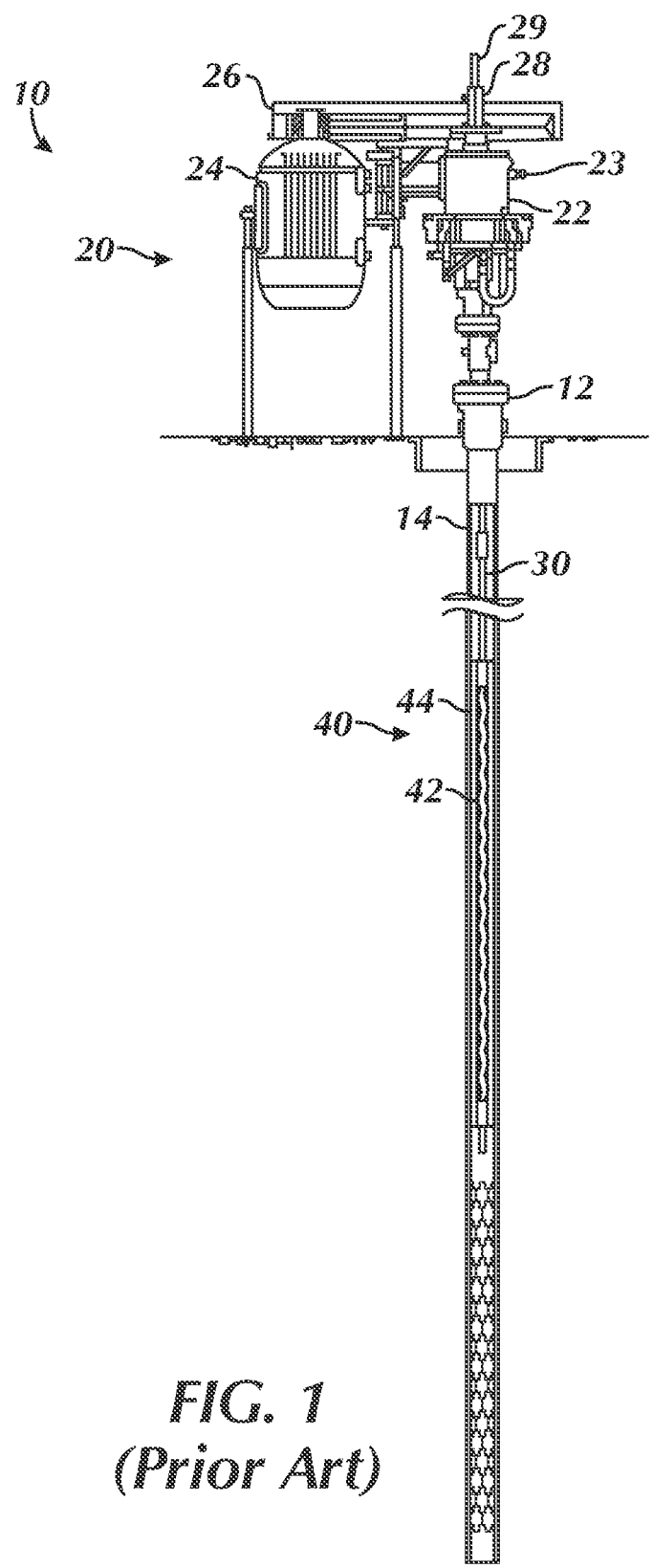
FIG. 1 illustrates a progressive cavity pump system according to the prior art.

Preferably, brake actuator 100 mounts to the progressive cavity pump's drive (e.g., 20 in FIG. 1) in a way that does not interference with other wellhead components and that facilitates handling of the equipment. In FIG. 3, for example, brake actuator 100 mounts to the drive's brake cover 204 through which brake screw 200 locked by a locknut 202 puts pressure on brake shoe 210. Because torque transferred to screw 200 will also be transferred in the opposite direction to brake actuator 100, a mounting assembly 170 firmly connects brake actuator 100 to the drive's brake cover 204. For example, mounting assembly 170 has sidewalls 172/174 that are supported by ribs 176 and that mount onto the steel block of the cover 204 using anchor bolts 178. Preferably, anchor bolts 178 attach the brake actuator 100 in an axial direction to brake cover 204, while sidewalls 172, 174 and ribs 176 firmly fit around the shape of brake cover 204 to prevent rotation of the brake actuator 100 during use. Different configurations for mounting assembly 170 can be used to mount the brake actuator 100 on any of the various types of drive head blocks available in the art.

To control rotation by the application of braking force by the brake screw 200, the brake actuator 100 includes a motor 110, a reducer 120, and an adapter socket 160. Motor 110 can be of any type such as an electrical or a hydraulic motor. Reducer 120 used to activate the brake screw 200 can use a reducer system such as gears, pulleys, endless screw/crown, or the like. Reducer 120 in FIGS. 2 and 3, for example, includes a screw and crown mechanism having an endless screw 122 and a crown 140 positioned in a housing 130. Screw 122 couples to a motor shaft 112 and interfaces with crown 140, which rotates on an exit shaft 142. In turn, exit shaft 142 couples to the head of brake screw 200 using the adapter socket 160.

Position of adapter socket 160 is defined as a function of its size and the position of the brake screw 200's head at maximum braking capacity. Adapter socket 160 preferably provides a space to allow brake screw 200 to move in an axial direction when the brake is released. On the other hand, greater movement is expected in the tightening direction so actuator 100 can compensate for wear of shoe 210.

For reducer 120, screw 122 and crown 140 assemble between base plates 132 and 134 of housing 130. In turn, motor 110 mounts to a side plate 136, and motor shaft 112 connects directly to the reducer's screw 122. Conic roll bearings 124 support this screw 122 on both side plates 136, 138 to account for axial load. As for crown 140, upper and lower roller bearings 152 and 154 of different sizes support exit shaft 142 within base plates 132 and 134. As best seen in FIG. 3, lower roller bearing 154 is preferably larger than upper bearing 152 to facilitate assembly. Upper and lower spacers 153 and 155 are also used to keep crown 140 centered between the two bearings 152 and 154.

Within housing assembly 130, crown 140 attaches to exit shaft 142 using a cotter pin or the like. The opening for exit shaft 142 on lower base plate 134 is sized to support bearing 154, while an upper fitting is used in the opening on upper base plate 132. This upper fitting includes a first washer 156 to retain upper bearing 152 and attached with screws to base plate 132 and includes a second washer 158 attached to the end of exit shaft 142 by a central screw 159, causing it to fit against upper bearing 152. Most components of brake actuator 100 can be composed of carbon steel without the need for special treatment. Exit shaft 142 is preferably composed of SAE 1045 carbon steel or other thermally treated material.

Figure 4A:
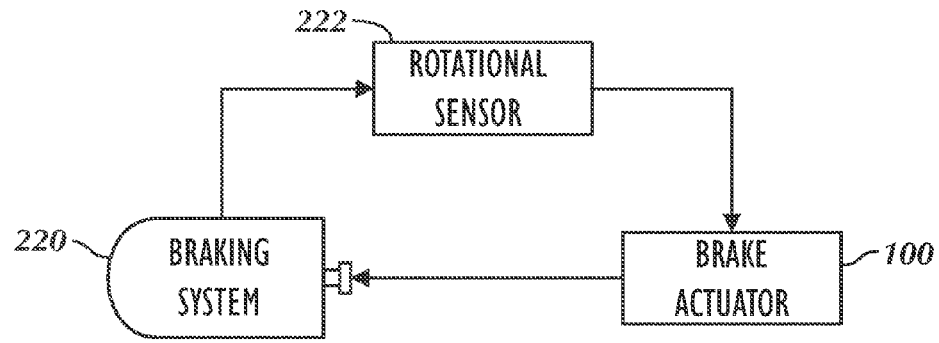
FIG. 4A schematically illustrates a feedback system used for automation of the disclosed brake actuator.

Actuator 100 can be operated using either manual or automatic operation. FIG. 4A schematically shows one form of feedback system for automatic operation. A rotational or speed sensor 222 detects the rotation or speed of the pump's drive shaft (e.g., 30 in FIG. 1). The sensor 222 can also detect the direction of rotation. Brake actuator 100 uses this sensed information (e.g., speed and/or direction) to increase or decrease the braking action applied by the existing braking system 220 of the pump's drive (e.g., brake screw 200, shoe 210, etc.).

Figure 4B:
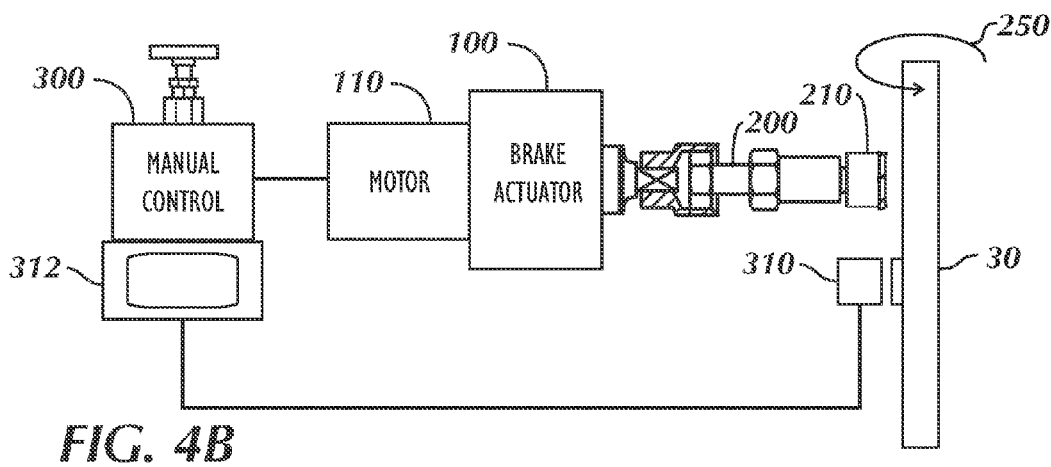
FIG. 4B illustrates one embodiment of an automated feedback system for the disclosed brake actuator.

In manual operation, an operator can activate brake actuator 100 using a manual control 300, such as schematically shown in FIG. 4B. The operator uses manual control 300 (e.g., switch, valve, dial, etc.) according to operational requirements to increase or decrease the speed of drive shaft 30. In this arrangement, a speed monitoring system has a sensor 310 and display 312 allowing the operator to read the shaft 30's speed/direction in real time. With this information, the operator, even remotely from a distance, can activate the brake actuator 100 to move brake screw 200 and shoe 210 relative to the rotation 250 of drive shaft 30 and either increase or decrease braking action accordingly.

Figure 4C:
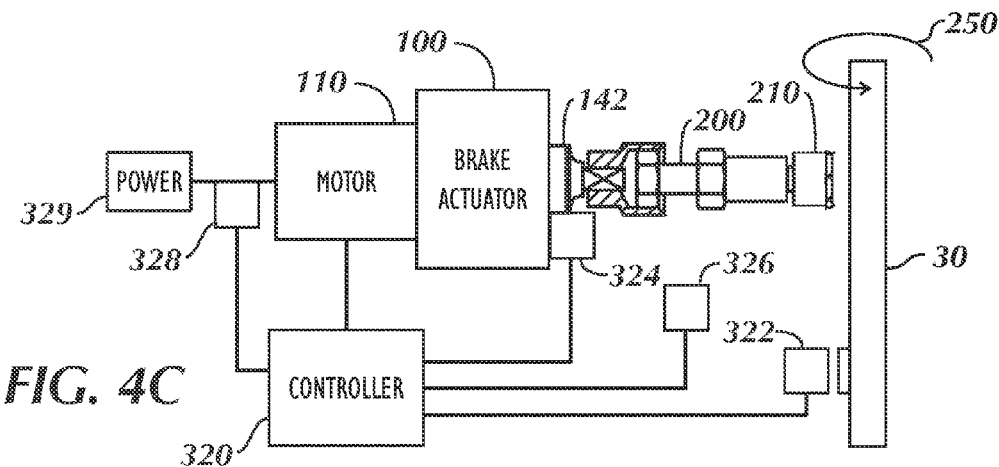
FIG. 4C illustrates another embodiment of an automated feedback system for the disclosed brake actuator.

For automatic operation, a controller 320 shown in FIG. 4C can have one or more sensors, such as a speed sensor 322 for monitoring drive shaft 30, a torque sensor 324 on exit shaft 142 for monitoring torque applied to brake screw 200, a displacement sensor 326 for monitoring displacement of brake screw 200, and a current sensor 328 for monitoring current consumption of the motor 110 from a power source 329. Using measured information generated by the sensors 322, 324, 326, the controller 320 can automatically operate the brake actuator 100 accordingly.

For example, the controller 320 can use shaft speed sensor 322, which could be any suitable type of sensor, to monitor shaft speed and control the brake actuator 100. Based on the sensor signal, for example, controller 320 controls operation of motor 110 of the brake actuator 100 and causes the motor 110 to turn one way or the other in accordance with the signal to actuate brake screw 200. Controller 320 preferably operates using predefined actuation parameters (e.g., speed threshold) for increasing or decreasing torque applied to brake screw 200 with the actuator's motor 110. If the parameters are exceeded, then controller 320 activates motor 110 accordingly.

As an example of the actuation parameters, rotation 250 of drive shaft 30 may be predefined for a threshold range of between 500-rpm and 1000-rpm. Speed sensor 322 monitors speed of drive shaft 30 during operation, and controller 320 monitors the measured speed. If the measured speed exceeds the 1000-rpm threshold, controller 320 operates motor 110 to turn brake screw 200 to increase the braking action produced. If, on the other hand, the speed falls below 500-rpm threshold, controller 320 operates motor 110 to turn in the proper direction to release brake screw 200 from drive shaft 30. The amount with which screw 200 is applied or released can be proportional to the amount that the measured speed has fallen above or below the thresholds of the range.

When controlling backspin of shaft 30, controller 320 releases screw 200 so that drive shaft 30 is allowed to turn and release its accumulated energy. Preferably, at the time rotation begins and independent of the shaft's particular speed, controller 320 stops releasing brake screw 200 momentarily to allow the shaft's speed to stabilize and balance. In this way, the speed is preferably reduced progressively to the point where brake screw 200 is completely loosened (but not disconnected from the drive head) and drive shaft 30 has stopped rotating because all accumulated energy has been dissipated. This progressive release is controlled automatically by controller 320 and speed sensor 322.

Using torque sensor 324, controller 320 can monitor the torque being applied by the brake actuator 100 to the brake screw 200 so that a maximum torque value is not exceeded. The maximum torque value depends in part on the size and type of brake screw 200 used. The torque sensor 324 can monitor the torque being applied to brake screw 200 by shaft 142 so that the torque does not exceed any mechanical limitations of the screw 200. This torque sensor 324 can include any conventional sensor for measuring torque. For example, torque sensor 324 can be a transducer connected to exit shaft 142. As an alternative, controller 320 can monitor electric current consumed by motor 110 from the power source 329 using a conventional current sensor 328 and can use this information to determine the torque being applied by the motor.

In addition to monitoring speed, controller 320 can monitor whether rotation of drive shaft 30 has stopped. By default, for example, controller 320 may turn brake screw 200 even while drift shaft 30 is fully stopped. Using displacement sensor 326, however, controller 320 can monitor the brake screw's movement or displacement. If drive shaft 30 stops rotating, the controller 320 can interpret this to mean that there is no remaining shaft energy, and controller 320 stops turning brake screw 200 after querying the displacement sensor 326 and determining that the brake screw 200 has been fully displaced. As an alternative, controller 320 can determine if motor 100 is just loosening brake screw 200 without acting on the brake based on whether the consumed current of the motor 110 as monitored by sensor 328 indicates minimal torque being applied in this situation.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A brake actuator for a progressive cavity pump, the progressive cavity pump having a first motor producing first output for rotating a drive shaft and having a rotatably-actuated brake mechanism for stopping rotation of the drive shaft, the brake actuator comprising:
    a second motor producing second output independent of the first output of the first motor for rotating the drive shaft;
    a coupling connecting the second output of the second motor to the rotatably-actuated brake mechanism of the progressive cavity pump to control the rotation of the drive shaft independent of the first output of the first motor; and
    a controller operatively coupled to the second motor and monitoring rotational speed of the drive shaft of the progressive cavity pump, the controller determining an amount of the second output of the second motor based on the rotational speed of the drive shaft of the progressive cavity pump and controlling operation of the second motor to produce the determined amount of the second output to apply to the brake mechanism.

2. The actuator of claim 1, further comprising:
    a body having the second motor; and
    a mount attaching the body to a portion of the progressive cavity pump.

3. The actuator of claim 1, wherein the controller comprises a speed sensor associated with the drive shaft and measuring the rotational speed thereof.

4. The actuator of claim 1, further comprising a reducer coupled to the second motor and reducing the second output from the second motor.

5. The actuator of claim 4, wherein the reducer comprises:
    a screw coupled to the second motor and rotated thereby; and
    a crown coupled to the screw and rotated thereby, the crown having a central shaft to which the coupling is attached.

6. The actuator of claim 1, wherein the controller comprises a sensor associated with the second output of the second motor, the controller determining a torque level applied to the rotatably-actuated brake mechanism based on a measurement with the sensor and deactivating the second motor if the determined torque level at least meets or exceeds a maximum torque level.

7. The actuator of claim 1, wherein the controller comprises a sensor associated with the brake mechanism, the controller determining displacement of the rotatably-actuated brake mechanism based on a measurement from the sensor and deactivating the second motor if the determined displacement at least meets or exceeds a maximum displacement value.

8. The actuator of claim 1, wherein the second motor comprise an electric motor, and wherein the controller comprises a sensor monitoring current consumption of the electric motor, the controller determining a level of torque being applied to the rotatably-actuated brake mechanism by the electric motor based on the consumed current.

9. The actuator of claim 8, wherein the controller deactivates the second motor if the determined torque level at least meets or exceeds a maximum torque level.

10. The actuator of claim 1, wherein the second motor comprise an electric motor, and wherein the controller comprises a sensor monitoring current consumption of the electric motor, the controller deactivating the electric motor if the current consumption falls below a minimum threshold.

11. A brake actuator for a progressive cavity pump, the progressive cavity pump having a first motor producing first output for rotating a drive shaft and having a rotatably-actuated brake mechanism for stopping rotation of the drive shaft, the brake actuator comprising:
    a second motor providing input rotation in first and second directions, the input rotation being independent of the first output of the first motor for rotating the drive shaft;
    a reducer coupled to the second motor and reducing the input rotation into second output in the first and second directions independent of the first output of the first motor for rotating the drive shaft;
    a coupling connecting the second output of the reducer to the rotatably-actuated brake mechanism of the progressive cavity pump to control the rotation of the drive shaft independent of the first output of the first motor;
    a first sensor associated with the drive shaft of the progressive cavity pump and measuring rotational speed of the drive shaft; and
    a controller operatively coupled to the second motor and the first sensor, the controller controlling the second motor to provide the input rotation in either the first or the second direction to the reducing assembly based on the rotational speed of the drive shaft of the progressive cavity pump measured by the first sensor.

12. The actuator of claim 11, further comprising:
    a body having the second motor and the reducer; and
    a mount attaching the body to a portion of the progressive cavity pump.

13. The actuator of claim 11, wherein the reducer comprises:
    a screw coupled to the second motor and rotated thereby; and
    a crown coupled to the screw and rotated thereby, the crown having a central shaft to which the coupling is attached.

14. The actuator of claim 11, further comprising a second sensor associated with the second output of the reducer and coupled to the controller, wherein the controller determines a torque level applied to the rotatably-actuated brake mechanism based on a measurement with the second sensor and deactivates the second motor if the determined torque level at least meets or exceeds a maximum torque level.

15. The actuator of claim 11, further comprising a second sensor associated with the brake mechanism and coupled to the controller, wherein the controller determines displacement of the rotatably-actuated brake mechanism based on a measurement from the second sensor and deactivates the second motor if the determined displacement at least meets or exceeds a maximum displacement of the brake mechanism.

16. The actuator of claim 11, wherein the second motor comprise an electric motor, and wherein the actuator further comprises a second sensor coupled to the controller, the controller monitoring current consumption of the electric motor with the second sensor and determining a level of torque being applied to the rotatably-actuated brake mechanism by the electric motor based on the consumed current.

17. The actuator of claim 16, wherein the controller deactivates the second motor if the torque level at least meets or exceeds a maximum torque level.

18. The actuator of claim 11, wherein the second motor comprise an electric motor, and wherein the actuator further comprises a second sensor coupled to the controller, the controller monitoring current consumption of the electric motor with the second sensor and deactivating the electric motor if the current consumption falls below a minimum threshold.

19. A brake actuator for a progressive cavity pump, the progressive cavity pump having a first motor producing first output for rotating a drive shaft and having a rotatably-actuated brake mechanism for stopping rotation of the drive shaft, the brake actuator comprising:
- means for providing second output in first and second directions independent of the first output of the first motor for rotating the drive shaft;
- means for coupling the second output to the rotatably-actuated brake mechanism of the progressive cavity pump to control the rotation of the drive shaft independent of the first output of the first motor;
- means for sensing rotational speed of the drive shaft of the progressive cavity pump; and
- means for controlling the second output in the first and second directions to the rotatably actuated brake mechanism based at least in part on the rotational speed.

20. The actuator of claim 19, wherein the means for controlling comprises:
- means for indicating the rotational speed to an operator; and
- means for manually operating by the operator the second output in the first and second directions.

21. The actuator of claim 19, wherein the means for controlling comprises:
- means for automatically operating the second output in the first and second directions in response to the rotational speed.

22. The actuator of claim 19, further comprising means for deactivating the second output to the brake mechanism based on a torque level applied to the rotatably-actuated brake mechanism at least meeting or exceeding a maximum torque level.

23. The actuator of claim 19, further comprising means for deactivating the second output to the brake mechanism based on a displacement of the rotatably-actuated brake mechanism at least meeting or exceeding a maximum displacement.

24. The actuator of claim 19, further comprising means for deactivating the second output to the rotatably-actuated brake mechanism based on a level of current consumption falling below a minimum threshold or exceeding a maximum threshold.

* * * * *